United States Patent [19]

Hair et al.

[11] Patent Number: 4,680,332

[45] Date of Patent: Jul. 14, 1987

[54] INK JET COMPOSITIONS AND PROCESS FOR PREPARATION THEREOF

[75] Inventors: Michael L. Hair, Oakville; Kar P. Lok, Sarnia; Christopher K. Ober; Melvin D. Croucher, both of Oakville; Raymond W. Wong, Mississauga, all of Canada

[73] Assignee: Xerox Corporation, Stamford, Conn.

[21] Appl. No.: 822,173

[22] Filed: Jan. 24, 1986

[51] Int. Cl.$^4$ .......................... C08K 5/05; C08K 5/06
[52] U.S. Cl. .................... 524/377; 524/379; 524/388; 524/389; 524/577; 524/560; 524/561; 524/562; 524/762; 106/22; 260/DIG. 38
[58] Field of Search ............. 524/389, 379, 377, 388, 524/577, 560, 561, 562, 762; 106/22; 260/DIG. 38

[56] References Cited

U.S. PATENT DOCUMENTS

| | | |
|---|---|---|
| 3,903,034 | 9/1975 | Zabiak et al. ............... 260/29.6 WB |
| 4,032,463 | 6/1977 | Kawanishi et al. ............ 252/62.1 L |
| 4,136,076 | 1/1979 | Daniels . |
| 4,157,974 | 6/1979 | Brechlin et al. ............... 252/62.1 L |
| 4,165,399 | 8/1979 | Germonprez . |
| 4,168,254 | 9/1979 | Fell . |
| 4,210,566 | 7/1980 | Murray . |
| 4,476,210 | 10/1984 | Croucher et al. ................ 430/114 |
| 4,543,102 | 9/1985 | Défago et al. .................... 106/22 |

OTHER PUBLICATIONS

Color Index–vol. 3 by Society of Dyers and Colourists–pp. 3563, 3564.

*Primary Examiner*—Joseph L. Schofer
*Assistant Examiner*—N. Sarofim
*Attorney, Agent, or Firm*—E. U. Palazzo

[57] ABSTRACT

Disclosed is a heterophase ink composition comprised of a water insoluble polymer dispersed in a liquid medium, the polymer containing therein an oil soluble dye, and a nonionic stabilizer permanently attached thereto.

18 Claims, No Drawings

INK JET COMPOSITIONS AND PROCESS FOR PREPARATION THEREOF

BACKGROUND OF THE INVENTION

The present invention is generally directed to compositions particularly useful as marking materials in various imaging systems, and more specifically the present invention is directed to heterophase ink compositions useful in ink jet printing systems, and to processes for the preparation of these compositions. Accordingly, in one embodiment of the present invention, there are provided heterophase ink compositions comprised of polymeric substances with specific stabilizers, especially nonionic stabilizers, and oil soluble dyes. The aforementioned inks possess improved waterfastness characteristics, excellent dot and edge definition, and permit decreased ink spreading. Also, the heterophase ink compositions of the present invention enable the print quality of the images generated to be of high resolution, thus allowing these inks to be selected for plain paper making technologies.

Compositions useful in ink jet printing systems generally contain therein water soluble dyes. Thus, there is disclosed, for example, in U.S. Pat. No. 3,846,141 an ink jet composition comprised of an aqueous solution of a water-soluble dye and a humectant material formed of a mixture of a lower alkoxy triglycol, and at least one other compound selected from the group consisting of a polyethylene glycol, a lower alkyl ether of diethylene glycol, and glycerol. According to the disclosure of this patent, the printing inks viscosity is subjected to little variation with use as water is lost by evaporation during recirculation of the ink composition through the jet printer. Moreover, apparently the humectant system disclosed in this patent substantially prevents or minimizes tip drying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 10 to 200 microns which is energized by magneto restrictive piezo-electric means for the purpose of emitting a continuous stream of uniform droplets of ink at a rate of 33 to 75 kilohertz. This stream of uniform droplets is desirably directed onto the surface of a moving web of, for example, paper; and is controlled to form printed characters in response to video signals derived from an electronic character generator and in response to an electrostatic deflection system; or drop on demand ink propulsion system.

Also, there is disclosed in U.S. Pat. No. 4,279,653, ink jet compositions with water soluble wetting agents, a water soluble dye and an oxygen absorber. Similarly, U.S. Pat. No. 4,196,007 describes an ink jet printing composition containing an aqueous solution of a water soluble dye and a humectant consisting of at least one water soluble unsaturated compound. Other prior art disclosing aqueous inks for ink jet printing include U.S. Pat. Nos. 4,101,329; 4,290,072 and 4,299,630.

Ink compositions for jet printing can be prepared by a number of known methods. Generally, these methods involve dissolving the various dyes, humectants, viscosity control agents, paper fixing additives, surface tension control additives, biocides and anti-oxidants in a known volume of water, followed by adjusting the pH and concentration of the solution to desirable levels. In those situations wherein the colorants selected are not water soluble, such as those containing pigments, the inks are prepared by standard known milling processes. However, these pigment dispersions are generally not sufficiently stable, accordingly when incorporated into a printing machine, the ink particles tend to agglomerate resulting in the clogging of the small nozzles present in the ink jet devices. One of the important objectives of the present invention resides in the preparation of discrete particles uniformly sized and specifically stabilized sterically, enabling the elimination of the undesirable agglomeration of these particles which are prepared by in situ polymerization techniques. Thus, for example, with the inks of the present invention the nonionic stabilizer selected is not absorbed as is the situation with known emulsion or suspension polymerization processes; accordingly, coagulation of the ink particles is substantially prevented.

Further, in U.S. Pat. No. 3,346,494 there is described a process for preparing stable microemulsions by the addition of a dispersable phase to a continuous phase to which has been added a selected combination of microemulsifiers. Examples of the continuous phase include liquid hydrocarbons such as benzene, while the dispersable phase contains a material which is insoluble in the hydrocarbon. The microemulsifier used in the process of the '494 patent is apparently comprised of three ingredients; namely, a fatty acid, an amino alcohol, and an alkyl phenol, reference the disclosure in column 1, beginning at line 64.

Additionally, polymer particles can be prepared by known suspension polymerization or emulsion polymerization processes. Both of these techniques are heterogeneous reactions in which a monomer droplet is stabilized in an aqueous dispersion medium and the particle is formed by a free radical polymerization mechanism. In suspension polymerization, there is selected a monomer soluble free radical initiator situated in the monomer droplets which are of large size, approaching 40 to 300 microns in diameter, with stabilization of the suspension being accomplished with a dispersant or suspending agent which is not considered a surfactant. With emulsion polymerization, water soluble initiators located in the dispersion medium are employed and typically ionic surfactants are used for the purpose of stabilizing the resulting dispersions. In contrast with the dispersion polymerization of the process of the present invention, the reaction mixture is initially homogeneous. Also, with the process of the present invention after initiation of the polymerization, the polymer chain grows to a particular chain length at which point it phase separates to yield nuclei which are then stabilized against flocculation by the presence of a steric stabilizer at the particle-fluid interface. One primay advantage of the aforementioned dispersion polymerization process is that it can be affected in both aqueous and nonaqueous media.

There is also disclosed in U.S. Pat. No. 4,246,154 a process for permitting the formulation of ink jet compositions from vinyl polymer lattices by a dye imbibition technique. The aforementioned anionically stabilized lattices which are obtained by emulsion polymerization are colored with a dye imbibition process. Coloring processes as illustrated in Konishiroku EP Publication No. 0.068,9003 and DE No. 3,233,555 are similar to the '154 patent ink jet procedures with the exception that there is used in the latter a preformed polyurethane latex. In contrast to these colored emulsions, which are usually stable over a narrow pH range and are extremely sensitive to the concentration of electrolyte, the process of the present invention permits colored polymer particles that, although of a similar particle size, are substantially insensitive colloidally to both pH, precipation or flocculation of the ink particles, and the concentration of electrolyte.

Further, disclosed in copending application U.S. Ser. No. 553,598, entitled Ink Jet Compositions and Processes for Preparation, the disclosure of which is totally incorporated herein by reference, is an ink composition comprised of polymers having dissolved therein oil soluble dyes; and containing surfactants, which composition is dispersed in an aqueous medium. Specifically disclosed in this copending application is an ink composition useful for jet printing processes comprised of a water insoluble polymer dispersed in an aqueous solution, the polymer containing therein an oil soluble dye in an amount of from about 5 percent by weight to about 25 percent by weight; and surfactant particles in an amount of from about 1 percent by weight to about 10 percent by weight. Additionally, disclosed in the aforementioned copending application is a process for the preparation of particles for ink jet printing which comprises (1) providing a monomer having dissolved therein oil soluble dye, (2) dissolving polymerization initiator into the monomer, (3) mixing the resulting solution with water containing a surface active agent therein, (4) subjecting the resulting mixture to ultrasound vibrations, while simultaneously or subsequently heating the mixture to affect polymerization, thereby resulting in polymer particles containing the oil soluble dye and surface active agent, which particles are essentially monodispersed and are of a diameter of from about 0.03 microns to about 2 microns.

Whereas the size of the particles produced in the process of the aforementioned copending application are determined by the mechanical homogenization process, in the present process particle sizes are dependent upon the reaction conditions selected which determines the number of particle nuclei produced from the homogeneous phase and therefore the final particle size. Stabilizers used in the two processes are also different, therefore, with the inks of the copending application, the droplets are stabilized with low molecular weight ionic or nonionic surfactants, while with the process of the present application the steric stabilizers are low, medium or high molecular weight, nonionic materials. Therefore, for example, with the inks of the present invention a larger variety of dyes can be selected because they need not withstand the oxidative environment present in the polymerizing droplets of the copending application since with the process of the present invention the dye is not introduced during the polymerization.

Although the above compositions are suitable for their intended purposes, there continues to be a need for new inks for jet printing, and processes for preparing these compositions. Additionally, there continues to be a need for ink jet compositions which when in use result in superior optical print densities, and have excellent waterfastness characteristics. Moreover, there continues to be a need for inks that contain oil soluble dyes therein, and wherein the inks are of desired particle diameter sizes. Further, there is a need for ink compositions, preferably of a diameter of 0.5 microns or less which contain an oil soluble dye therein, and are waterfast, have an excellent affinity for paper substrates and superior drying times. There is also a need for ink jet compositions with oil soluble dyes wherein the colorant can be localized therein. Furthermore, there continues to be a need for new polymerization processes, particularly processes applicable to the preparation of ink jet compositions of a suitable particle size, which processes are simple and economical in their approach. Also, in accordance with the present invention, there is provided inks desirably containing therein dyes situated, for example, in the interior of the ink particles thus enabling the dye to be chemically protected, and further preventing such materials from affecting the surface tension of the particles involved. Additionally, when these compositions impinge the paper substrate during jet printing, there is precipitated immediately on the fibers the ink particles, primarily in view of the colloidal characteristics of these particles. Accordingly, such particles separate from the colorless suspending fluid rather than undesirably penetrating into the paper. With penetration there occurs the known problem of show-through, feathering, or chromatographic separation of the dye components. In this regard, it is difficult to prepare waterfast images from water soluble dyes since the ink jet compositions are complex in that in addition to the dyes incorporated therein they contain additives to prevent oxidation thereof, additives for fixing and for controlling viscosity of the liquid ink particles, as well as additives for controlling the evaporation rate and biological activities thereof.

Also, several of the prior art ink compositions described herein are homogeneous solutions comprised of, for example, a solvent vehicle, such as water, ethylene glycol, and dimethyl sulfoxide, and a molecularly dissolved dye. The dyes selected for these inks must be of a sufficient polarity to enable their dissolution in the solvents selected. Accordingly, images obtained with these ink compositions usually have poor waterfastness characteristics. Additionally, extensive dye and solvent diffusion into the paper substrate causes undesirable ink spreading, thereby resulting in low image resolution and inferior edge acuity. The two phase ink compositions of the present invention resolve these problems.

SUMMARY OF THE INVENTION

It is an object of the present invention to provide ink compositions, which overcome many of the above-noted disadvantages.

In another object of the present invention there are provided ink compositions containing oil soluble dyes therein, which compositions are useful in jet printing systems.

Further, in still another object of the present invention there are provided ink compositions with excellent waterfastness characteristics.

A further object of the present invention resides in the provision of ink compositions with acceptable dot and edge definition.

A still further object of the present invention resides in the provision of ink compositions with reduced ink spreading properties.

Another important object of the present invention is the provision of heterophase ink compositions with nonionic stabilizers therein.

In still another important object of the present invention there are provided colored ink compositions with diameters of 0.5 microns or less thereby enabling their use, for example, in ink jet printing processes without nozzle clogging.

In a further object of the present invention there are provided processes for the preparation of ink jet compositions containing oil soluble dyes, and nonionic stabilizers.

An additional object of the present invention resides in the provision of colored ink compositions of desired sizes containing, in addition to oil soluble dyes, optional difunctional monomers like divinyl benzene.

A further object of the present invention is the provision of heterophase ink compositions wherein the print quality of the images developed are independent of the ink paper interactions, thereby permitting these inks to be selected for plain paper processes.

Moreover, in a further object of the present invention there are provided ink jet compositions, wherein the sterically stabilized lattices are insensitive to pH and electrolyte concentration, thus biocides and other additives may be introduced without coagulating the particles.

These and other objects of the present invention are accomplished by the provision of novel ink compositions for jet printing comprised of polymers, certain stabilizers, and oil soluble dyes; and to processes for preparing these compositions. More specifically, in one embodiment, the present invention is directed to heterophase ink compositions dispersed in an aqueous medium comprised of polymeric compositions, nonionic stabilizers, and dissolved therein oil soluble dyes. There is thus provided in one embodiment of the present invention a heterophase ink composition useful for jet printing processes comprised of a water insoluble polymer, dispersed in water optionally dispersed in an aqueous solution of aliphatic alcohol and water, or dispersed in a nonaqueous solution, the polymer containing therein an oil soluble dye in an amount of, for example, from about 5 percent by weight to about 25 percent by weight; and attached to the polymer particles a nonionic stabilizer in an amount of from about, for example, 1 percent by weight to about 10 percent by weight.

In another embodiment of the present invention, there is provided a process for the preparation of particles for ink jet printing which comprises (1) dissolving in a reaction medium, preferably comprised of an aliphatic alcohol solvent present in an amount of from about 0.5 percent to about 50 percent, a nonionic stabilizer; (2) adding a monomer with polymerization initiator dissolved therein to the solution; (3) affecting polymerization wherein the nonionic stabilizer is permanently attached thereto; and (4) introducing into the aforementioned polymerization product a dye solution having incorporated therein various dyes inclusive of red, blue, yellow, cyan, magenta, black, or mixtures thereof, followed by subsequently removing any residual solvent.

Another preferred embodiment of the present invention is directed to a process for the preparation of heterogeneous ink compositions which comprises (1) dissolving in an aqueous ethanol solvent mixture, where ethanol is preferably present in an amount of from about 10 to about 30 percent by weight, a nonionic stabilizer selected from poly(vinyl alcohol), hydroxypropyl cellulose, poly(vinyl pyrrolidone) and Pluronic F68; (2) adding a styrene and n-butylmethacrylate comonomer mixture (60/40) in an amount of from about 5 to about 50 percent by weight with from about 0.5 percent to about 20 percent by weight monomer of an initiator such as benzoyl peroxide, azobisisobutyronitrile (AIBN) or benzoyl peroxide, and (3) heating the resulting mixture at from about 50° C. to about 100° C. to affect polymerization over a time of from about 5 hours to about 24 hours. The resulting polymer particles are then stirred for from about 0.5 hours to about 5 hours with a solution of from about 5 to about 50 percent by weight of a dye, such as Pylachrome Pink LX1900, Sudan Black B, Neozapon 807, or Sudan Yellow 146, and the like.

Monomers that may be selected for the process of the present invention include various known materials such as vinyl monomeric substances including styrene, parachlorostyrene, and vinyl naphthalene; vinyl halides such as vinylchloride, vinylbromide, vinylfluoride, vinylacetate, vinylbenzoate, and vinylbutyrate; vinyl esters such as esters of monocarboxylic acids, including methylacrylate, ethylacrylate, n-butylacrylate, isobutylacrylate, dodecylacrylate, n-octylacrylate, 2-chloroethylacrylate, phenylacrylate, methylmethacrylate, ethylmethacrylate, butylmethacrylate, and the like; acrylonitrile; and mixtures thereof. Other monomers may be suitable for use in the process of the present invention providing they are capable of free radical polymerization, and allow the objectives of the present invention to be affected. Particularly preferred monomers polymerized in accordance with the present invention, and present as a component in the final ink composition, include styrene, butylmethacrylates, lauryl methacrylates, ethylhexyl acrylates, and other similar acrylates wherein the carbon chain length is from about 1 to about 18 carbon atoms. One important characteristic of the monomer selected, such as styrene, is that these monomers are not soluble to any significant extent in water, that is, the solubility in water of these monomers is less than about 1 percent.

From about 5 percent by weight to about 50 percent by weight, and preferably from about 10 percent by weight to about 25 percent by weight of monomer was selected for the process of the present invention. Accordingly, the resulting ink compositions contain from about 5 percent by weight to about 50 percent by weight, and preferably from about 10 percent by weight to about 25 percent by weight of polymer subsequent to polymerization of the monomer component.

As stabilizers there are selected only nonionic compositions, including ethylene oxide propylene oxide block copolymers, with a molecular weight of about 8,000 available as Pluronic F68, poly(ethylene oxide) tertiary octylphenol, poly(vinyl alcohol), hydroxypropyl cellulose, poly(vinyl pyrrolidone), poly(ethylene oxide), poly(ethylene imine), and poly(ethylene oxide) monomethyl ether. From about 0.1 percent to about 20 percent by weight, and preferably from about 10 percent by weight of stabilizer are selected for the polymerization. These nonionic stabilizers are essential in that they permit particle formation processes to occur in a nonaqueous solvent such as an alcohol or aqueous solvent mixtures while also permitting dispersion of the resulting particles in a water phase.

Also of importance with respect to the ink compositions of the present invention are the components of the reaction medium. Generally, this medium is comprised of an aliphatic alcohol in an amount of from about 10 percent by volume to about 100 percent by volume, and water in an amount of from 0 percent by volume to 90 percent by volume. In this manner, there can be obtained ink composition particles of a diameter of from about 0.1 to about 0.5 microns.

Various suitable known polymer initiator substances can be selected including peroxides, such as benzoyl peroxide, lauroyl peroxide, azo-type initiators such as azobisisobutyronitrile, Vazo 52 commercially available from E. I. duPont, and the like. The initiator, which allows the polymerization reaction to proceed, is incorporated into the monomer solution mixture in an amount of from about 0.5 percent by weight to about 15 percent by weight, and preferably in an amount of from about 2 percent by weight to about 3 percent by weight. This initiator is consumed during the polymerization reaction.

Illustrative examples of oil soluble dyes, that is, dyes that will remain substantially dissolved in the polymer include azo dyes, such as Sudan Black commercially available from Fisher, Inc.; Sudan I, and nigrosine commercially available from Aldrich Chemical; Sudan II, commercially available from Aldrich Chemical; and other classes of dyes such as Yellow Dyes commercially available from Pylam, Inc.; Neozapan Red GE, available from BASF Chemical Company; Oil Blue A dyes, commercialluy available from E. I. duPont; Methyl Violet 1 B, commercially available from Aldrich Chemical; Sudan Red BB, commercially available from BASF Chemical Company; Sudan Red 7B, Sudan Black B, Sudan Yellow 146, Neozapon Blue, Oracet Yellow GN, available from Ciba-Geigy; BASF Sudan Yellow 150, BASF Sudan Red 7B, Oil Yellow, Bayer Ceres Red 3R, Orient Chemical Ind., Ltd.; Oil Pink 312, Pylam Pylakrome Pink LX 1900, Bayer Ceres Blue R, BASF Neozapon 807, BASF Sudan Deep Black, Bayer Ceres Black BN; and the like. These dyes impart the desired color to the ink particles, thus for example, the Oil Pink 312 results in particles with a magenta color, and Neozapan 807 provides cyan ink particles.

A dye solution comprised of the dyes illustrated herein and an organic solvent is diffused into the polymerized product by a dye imbibition process. The dye solution may be added to the particle mixture either in the form of an aqueous emulsion or directly in the form of a solution depending on the selected dyeing procedure. With the emulsion approach, illustrative examples of surfactants that may be selected are ionic and nonionic surfactants, which are not chemically attached to the polymer, as is the situation with the stabilizers of the present invention such as sodium laurate, sodium lauryl sulfate, sodium oleate, potassium oleate, polyoxyethylene tertiary octyl phenol, polyoxyethylene sorbitol monolaurate, sucrose palmitate, potassium stearate, ammonium naphthenate, morpholine laurate, sulfated propyloleate sodium salts, sulfonated castor oil, sodium diaryl sulfosuccinate, sodium lignosulfonate, N-polyethoxystearylamine, dodecyltrimethylammonium chloride, methyl dodecylbenzyl trimethyl ammonium chloride, lauryl pyridinium chloride, and the like. This surfactant is dissolved in an aqueous solution in an amount of from about 0.1 percent by weight to about 10 percent by weight, and preferably in an amount of from about 0.2 to about 2 percent by weight. Accordingly, water such as deionized water is present in this mixture in an amount of from about 90 percent by weight to about 99.9 percent by weight, and preferably in an amount of from about 98 percent by weight to about 99.8 percent by weight. This surfactant solution is then used to prepare an emulsion of the dye organic solvent solution which can be used in the dyeing procedures.

As organic solvents there can be selected halogenated aliphatic compositions including methylene chloride, toluene, cyclohexane, butylacetate, and the like. Generally, from about 1 milliliter to about 50 milliliters of solvent are selected for each gram of dye to be dissolved. Dissolving of the dye is accomplished by a simple stirring of the polymerized mixture, solvent, and dye. Subsequent to the evaporation of the solvent from the reaction mixture, the dye is retained in the polymer particles.

Also, the dye solution can be added to the polymerized particles in various suitable amounts providing the objectives of the present invention are achieved, however, the dye solution is added in an amount of from about 10 percent to about 50 percent by weight of the polymer particles. Upon the addition of the dye solution to the polymerized mixture, an entropic dilution effect due to the initial absence of dye in the particles and the high polymer concentration causes the dye to diffuse through the solvent medium and into the polymer particles. The effectiveness and completion of this diffusion process is dependent on a number of factors including the concentration of the dye, solvent, and polymer particles; the specific types of dyes used; the nature of the particles being treated; and the temperature at which the process is accomplished.

The particle sizes of the materials prepared subsequent to polymerization can be determined by various known techniques, however, in accordance with the process of the present invention these sizes were obtained with a Coulter Nanosizer light scattering apparatus and also measured with electron microscopy. Other properties associated with the ink compositions of the present invention include a pH of from about 4 to about 10, a surface tension of from about 45 dynes/cm to about 65 dynes/cm, and a viscosity of from about 1 to about 10 centipoises.

Furthermore, the ink compositions of the present invention have excellent waterfastness, that is, they adhere to the substrate surface in view of the presence of oil soluble dyes. The colored ink particles also have self binding properties toward paper which means that once they are laid down they resist removal from the paper. Moreover, the ink particles, in view of their diameters, were found to be very useful in ink jet printing systems since, for example, the ink jet nozzles directing the ink remained essentially open and unclogged. Also, the size of the resulting particles specified hereinbefore enabled them to penetrate the spaces between the fibers contained on the paper substrate, allowing a desirable matte finish despite the apparent high loading of polymer composition.

Optionally, there can be included in the ink compositions of the present invention difunctional monomers such as divinyl benzene, vinyl methacrylate, 2-butene-1,4-diacrylate, 2-butene-1,4-dimethacrylate, ethylene glycol diacrylate, ethylene glycol dimethacrylate, diethylene glycol diacrylate, diethylene glycol dimethacrylate, divinyl succinate, and other similar crosslinking compounds in amounts of from about 0.1 percent to about 1.0 percent by weight of monomer mixture, for the purpose of reducing further the diameters of the ink particles to, for example, 0.2 micron from 0.5 micron. Although it is not desired to be limited by theory, it is believed that the presence of the difunctional monomer acts to increase the average molecular weight of the polymer being produced and thereby further reduces its already limited solubility in the reaction medium. This causes the formation of more particle nuclei during the polymerization, and thereby leads to particles of a smaller diameter on completion of the reaction.

The following examples are being supplied to further define various species of the present invention, it being noted that these examples are not intended to limit the scope of the present invention; parts and percentages are by weight unless otherwise indicated.

EXAMPLE I

There were prepared copolymer particles by dissolving 5 grams of the stabilizer Pluronic F68 in 200 milliliters of ethanol and 100 milliliters of water at a temperature of 68° C. with stirring under a nitrogen atmosphere. Subsequent to dissolution of the stabilizer, there was added a solution composed of 24 milliliters of styrene, 16 milliliters of n-butylmethacrylate, and 1.5 grams of benzoyl peroxide. Within 2 minutes the reaction mixture became cloudy indicating the initiation of the polymerization, and after 24 hours there resulted prior to coloring a product consisting of copolymer particles with an average diameter of 500 nanometers.

The product copolymer particles with Pluronic F68 stabilizer anchored thereto were removed from the solvent medium by centrifugation and dispersed in 100 milliliters of 0.25 percent aqueous sodium dodecyl sulfate solution containing 5 to 30 percent by weight of acetone.

A dye solution consisting of 20 percent by weight of Passaic Oil Red 2144 dissolved in 50 milliliters of methylene chloride was then added to 100 milliliters of a 0.25 percent aqueous sodium dodecyl sulfate solution, and this mixture was sonified for 5 minutes resulting in a homogeneous emulsion. The resulting emulsion was then added to the above copolymer particle dispersion, and after stirring for 3 hours the acetone and methylene chloride was to evaporated by blowing air over the dispersion. Thereafter, to remove excess surfactant, the colored particles were centrifuged down and then redispersed in 200 milliliters of a water solution containing 1 percent Pluronic F68 by weight. There was obtained a red ink.

The above prepared red ink jet ink having a composition of 17 percent by weight copolymer, 2 percent by weight dye, 1 percent by weight Pluronic F68 and 80 percent by weight water was then incorporated into a Diablo C-150 ink jet printer and jetted. The resulting prints on 4024 paper had good edge acuity, that is, the spots on the paper as determined by microscopic examination, showed little observable feathering, possessed good waterfastness, greater than 90 percent, and had an optical density of greater than 0.5. Spot size was typically 20 percent smaller than the commercial inks supplied with the Diablo C-150.

EXAMPLE II

Polymer particles consisting of poly(vinyl stearate) were prepared by first dissolving 5 grams of the stabilizer poly(ethylene oxide), molecular weight, about 10,000 in 200 milliliters of ethanol and 100 milliliters of water at a temperature of 75° C. with stirring under a nitrogen atmosphere. Subsequent to dissolution of the stabilizer there was added a solution consisting of 50 milliliters of vinyl stearate and 1.0 gram of azobisisobutyronitrile (AIBN). Within 5 minutes the reaction mixture became cloudy indicating the polymerization had started, and after 24 hours there resulted prior to coloring a product consisting of polymer particles with an average diameter of 250 nanometers.

To the resulting poly(vinyl stearate) particles with poly(ethylene oxide) stabilizer anchored thereto and dispersed in the reaction medium was added a solution consisting of 10 grams of Pylachrome Pink LX1900 dye dissolved in 50 milliliters of methylene chloride. After stirring for 5 hours, the methylene chloride was permitted to evaporate. The resulting magenta ink consisted of 16 percent by weight poly(vinyl stearate), 2 percent by weight of dye, 2 percent by weight poly(ethylene oxide), 40 percent by weight ethanol and 40 percent by weight water; and after filtering through a Whatman #1 filter, paper could be jetted with a Diablo C-150 ink jet printer to yield magenta colored images.

EXAMPLE III

There were prepared polystyrene particles by dissolving 6 grams of the stabilizer Pluronic F68 in 380 milliliters of ethanol and 120 milliliters of water at a temperature of 70° C. with stirring under a nitrogen atmosphere for one half hour. Subsequent to dissolution of the stabilizer there was added a solution composed of 50 milliliters of styrene, and 0.5 grams of azobisisobutyronitrile. Within 2 minutes the reaction mixture became cloudy indicating the initiation of the polymerization, and after 24 hours there resulted prior to coloring a product consisting of polymer particles with an average diameter of 295 nanometers. The product copolymer particles with Pluronic F68 stabilizer anchored thereto were removed from the solvent medium by centrifugation, and dispersed in 100 milliliters of 0.25 percent aqueous sodium dodecyl sulfate solution containing 5 to 30 percent by weight of acetone.

A dye solution consisting of 20 percent by weight of Oil Blue A dissolved in 50 milliliters of toluene was then added to 100 milliliters of a 0.25 percent aqueous sodium dodecyl sulfate solution, and this mixture was sonified for 5 minutes resulting in a homogeneous emulsion. The emulsion was then added to the above polymer particle dispersion, and after stirring for 3 hours the acetone and toluene were removed by rotary evaporation. Thereafter, to remove excess surfactant, the colored particles were centrifuged down and then redispersed in 200 milliliters of a water solution containing 1 percent poly(vinyl pyrrolidone) by weight. There resulted a blue ink.

The above prepared ink jet ink having a composition of 17 percent by weight polystyrene with stabilizer attached thereto, 2 percent by weight dye, 1 percent by weight poly(vinyl pyrrolidone), and 80 percent by weight water was then incorporated into a Diablo C-150 ink jet printer and jetted. The resulting blue prints on 4024 paper had good edge acuity, showed little feathering, possessed a waterfastness of greater than 90 percent, and had an optical density of greater than 0.5. The spot size was 30 percent smaller than the commercial inks supplied with the Diablo C-150.

EXAMPLE IV

Polymer particles consisting of crosslinked poly(methylmethacrylate) were prepared by first dissolving 5 grams of the stabilizer poly(vinylpyrrolidone), molecular weight about 15,000, in 200 milliliters of ethanol, and 150 milliliters of water at a temperature of 70° C. with stirring under a nitrogen atmosphere. Subsequent to dissolution of the stabilizer, there was added a solution consisting of 50 milliliters of methylmethacrylate, 0.25 milliliters of ethylene glycol dimethacrylate, and 1.0 gram of lauroyl peroxide (LPO). Within 5 minutes the reaction mixture became cloudy indicating the polymerization had started, and after 30 hours there resulted prior to coloring a product consisting of polymer particles with an average diameter of 350 nanometers.

To the resulting crosslinked poly(methylmethacrylate) particles with poly(vinylpyrrolidone) stabilizer anchored thereto, and still dispersed in the reaction medium was added a solution consisting of 10 grams of Neozapon 807 dye dissolved in 50 milliliters of methylene chloride. After stirring for 5 hours, the methylene chloride was permitted to evaporate. The resulting cyan ink consisted of 16 percent by weight poly(methylmethacrylate), 2 percent by weight dye, 1 percent by weight poly(vinylpyrrolidone), 20 percent by weight ethanol and 61 percent by weight water; and after filtering through a Whatman #1 filter paper, the ink was jetted with a Diablo C-150 ink jet printer to yield cyan colored images with an optical density greater than 0.5.

EXAMPLE V

Polymer particles consisting of poly(laurylmethacrylate) were prepared by first dissolving 5 grams of the stabilizer polyoxyethylene tert-octylphenol (40 moles of ethylene oxide) in 200 milliliters of ethanol and 25 milliliters of water at a temperature of 75° C. with stirring under a nitrogen atmosphere. Subsequent to dissolution of the stabilizer, there was added a solution consisting of 30 milliliters of 2-ethylhexylmethacrylate and 1.5 grams of benzoyl peroxide. Within 10 minutes the reaction mixture became cloudy indicating the polymerization had started, and after 24 hours there resulted prior to coloring a product consisting of polymer particles with an average diameter of 400 nanometers.

To the resulting poly(laurylmethacrylate) particles with polyoxyethylene tert-octylphenol stabilizer anchored thereto and dispersed in the reaction medium was added a solution consisting of 5 grams of Sudan Black B dye dissolved in 50 milliliters of methylene chloride. After stirring for 5 hours, the methylene chloride was permitted to evaporate. The resulting black ink consisted of 25 percent by weight poly(laurylmethacrylate), 3 percent by weight dye, 2 percent by weight polyoxyethylene tert-octylphenol, 30 percent by weight ethanol and 40 percent by weight water; and after filtering through a Whatman #1 filter paper, were jetted with a Diablo C-150 ink jet printer to yield black images with an optical density greater than 0.5.

EXAMPLE VI

There were prepared crosslinked styrene-n-butylmethacrylate copolymer particles by dissolving 5 grams of the stabilizer Pluronic F68 in 200 milliliters of ethanol and 100 milliliters of water at a temperature of 68° C. with stirring under a nitrogen atmosphere. Subsequent to dissolution of the stabilizer, there was added a solution composed of 24 milliliters of styrene, 16 milliliters of n-butylmethacrylate, 0.2 milliliters of divinyl benzene and 1.5 grams of benzoyl peroxide. Within 1 minute the reaction mixture became cloudy indicating the initiation of the polymerization, and after 24 hours there resulted prior to coloring a product consisting of polymer particles with an average diameter of 200 nanometers.

To the resulting copolymer particles with Pluronic F68 stabilizer anchored thereto and dispersed in the reaction medium was added a solution consisting of 10 grams of Oil Yellow dissolved in 50 milliliters of methylene chloride. After stirring for 5 hours, the methylene chloride was permitted to evaporate, the colored particles were centrifuged down and redispersed in a 2 percent by weight aqueous solution of Pluronic F68. The resulting yellow ink consisted of 20 percent by weight copolymer, 2 percent by weight dye, 1 percent by weight Pluronic F68, and 77 percent by weight water; and after filtering through a Whatman #1 filter paper, were jetted with a Diablo C-150 ink jet printer to yield yellow colored images with an optical density greater than 0.5.

Other modifications of the present invention may occur to those skilled in the art as a result of a review of the present application, and these modifications are intended to be included within the scope of the present invention.

What is claimed is:

1. A heterophase ink jet composition comprised of a water insoluble polymer dispersed in a liquid medium selected from the group consisting of water, an alcohol, wherein the polymer contains therein an solvent soluble dye and a nonionic stabilizer permanently attached to the polymer, and mixtures of water and an alcohol; and wherein the resulting ink composition has a surface tension of from about 45 to about 65 dynes/cm.

2. An ink composition in accordance with claim 1 wherein the alcohol is an aliphatic alcohol.

3. An ink composition in accordance with claim 1 wherein the alcohol is methanol or ethanol.

4. An ink composition in accordance with claim 1 wherein the polymer is obtained by the polymerization of a vinyl monomer composition.

5. An ink composition in accordance with claim 1 wherein the polymer is selected from the group consisting of poly(styrene), poly(butylmethacrylate), poly(vinylstearate), poly(methylmethacrylate), poly(laurylmethacrylate). and copolymers thereof.

6. An ink composition in accordance with claim 1 wherein the solvent soluble dye is selected from the group consisting of a yellow dye, a green dye, a red dye, a black dye, a cyan dye, a magenta dye, a blue dye, and mixtures thereof.

7. An ink composition in accordance with claim 1 wherein the stabilizer is selected from the group consisting of an ethylene oxide propylene oxide block copolymer such as Pluronic F68, poly(ethylene oxide) tertiary octylphenol, poly(vinyl alcohol), poly(acrylic acid), hydroxypropyl cellulose, poly(vinyl pyrrolidone), poly(ethylene oxide), poly(ethylene imine), and poly(ethylene oxide)monomethyl ether.

8. An ink composition in accordance with claim 1 wherein the diameter of the resulting ink particles are from about 0.03 micron to about 5.0 microns.

9. An ink composition in accordance with claim 1 wherein the alcohol is selected from the group consisting of isopropanol, ethylene glycol, glycerol and diethylene glycol.

10. An ink composition in accordance with claim 1 wherein the water is present in an amount of from 50 to 100 percent by volume, and the alcohol is present in an amount of from 0 to 50 percent by volume.

11. An ink composition in accordance with claim 1 wherein there is present in the following amounts: from about 5 percent to about 50 percent by weight colored particles dispersed in a liquid medium, the particles containing therein from about 5 percent to about 25 percent by weight solvent soluble dye.

12. An ink composition in accordance with claim 1 wherein there is further incorporated into the ink composition humectants, biocides, and surface tension control agents.

13. An ink composition in accordance with claim 1 wherein the solvent soluble dye is present in an amount of from about 5 percent to about 25 percent by weight.

14. An ink jet composition in accordance with claim 1 wherein the liquid medium is comprised of water.

15. An ink jet composition in accordance with claim 1 wherein the liquid medium is comprised of a mixture of an alcohol and water.

16. An ink jet composition in accordance with claim 1 wherein the liquid medium is comprised of an aliphatic alcohol present in an amount of from about 10 percent by volume to about 100 percent by volume, and water present in an amount of from 0 percent by volume to 90 percent by volume.

17. A heterophase ink jet composition consisting essentially of a water insoluble polymer dispersed in a liquid medium selected from the group consisting of water, an alcohol, and mixtures of water and an alcohol; and wherein the resulting ink composition has a surface tension of from about 45 to about 65 dynes/cm.

18. A heterophase ink jet composition consisting essentially of a water insoluble polymer dispersed in a liquid medium selected from the group consisting of water, an alcohol, wherein the polymer contains therein an oil soluble dye and a nonionic stabilizer permanently attached to the polymer, and mixtures of water and an alcohol; and wherein the resulting ink composition has a surface tension of from about 45 to about 65 dynes/cm.

* * * * *